(12) United States Patent
Ito

(10) Patent No.: US 6,463,165 B1
(45) Date of Patent: Oct. 8, 2002

(54) INDIVIDUALS CHECKING APPARATUS

(75) Inventor: Hideaki Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/277,848

(22) Filed: Mar. 29, 1999

(30) Foreign Application Priority Data

Mar. 31, 1998 (JP) ............................................. 10-085797

(51) Int. Cl.$^7$ ................................................. G06K 9/00
(52) U.S. Cl. .................................................... 382/124
(58) Field of Search .............................. 382/115, 116, 382/124–127; 356/71; 340/5.53, 5.83; 713/186, 200; 902/3, 6

(56) References Cited

U.S. PATENT DOCUMENTS

| | | | |
|---|---|---|---|
| 5,426,296 A | 6/1995 | Shikai et al. | 250/227.2 |
| 5,493,621 A | * 2/1996 | Matsumura | 382/125 |
| 5,559,895 A | * 9/1996 | Lee et al. | 382/119 |
| 5,796,857 A | * 8/1998 | Hara | 382/124 |
| 5,999,637 A | * 12/1999 | Toyoda et al. | 382/124 |
| 6,259,805 B1 | * 7/2001 | Freedman et al. | 382/124 |

FOREIGN PATENT DOCUMENTS

| | | |
|---|---|---|
| JP | 61-177580 | 8/1986 |
| JP | 63-149776 | 6/1988 |
| JP | 7-120417 | 12/1995 |

* cited by examiner

*Primary Examiner*—Brian Werner
(74) *Attorney, Agent, or Firm*—Leydig, Voit & Mayer, Ltd.

(57) ABSTRACT

Upon recording fingerprints, a continuous fingerprint data recorder records, continuously, data about fingers of a person wishing to register. A recording status monitor monitors difficulties in data recognition which are contingent on the physical state of fingertips of the person in question. An automatic checking mode/level determinant determines a checking mode (AND or OR check) and a checking level suitable for each person in accordance with the state of his or her fingertips. The mode and level thus determined are recorded in a fingerprint database. Upon checking fingerprints, a personalized checking mode retriever and a personalized checking level retriever retrieve the checking mode and checking level of the person in question. A multiple fingerprint data checker and tester checks the recorded fingerprint data against input fingerprint data and determines the result of the checking.

5 Claims, 7 Drawing Sheets

| ID NUMBER | CHECKING MODE | CHECKING LEVEL | FINGERPRINT DATA (1) | FINGERPRINT DATA (2) | FINGERPRINT DATA (3) |
|---|---|---|---|---|---|
| x x x x | M | L | D1 | D2 | D3 |
| ○○○○ | AND/OR | 1~3 | | | |

| CATEGORY | RECORDING/ CHECKING FAILURE COUNT | CHECKING MODE | | CHECKING LEVEL | | |
|---|---|---|---|---|---|---|
| | | CHECKING MODE | NUMBER OF FINGERS | CHECKING LEVEL | FA | FR |
| NORMAL | 0~5 | OR | 3 | L1 | Pa1 | Pr1 |
| POOR | 5~10 | AND | 2 | L2 | Pa2 | Pr2 |
| WORST | 11 OR HIGHER | AND | 3 | L3 | Pa3 | Pr3 |
| | ⇐ COUNT | ⇐ Mlog | ⇐ Mnum | ⇐ Li | | |

INDIVIDUALS CHECKING APPARATUS

BACKGROUND OF THE INVENTION

1. Field of the Invention

The present invention relates to an individuals checking apparatus, or a human body checking apparatus, for checking fingerprints or like characteristics of individuals for identification purposes.

2. Background Art

There are cases where it is desired to restrict unauthorized entry into a certain area of a building. Measures to enforce such restriction may typically involve setting up a special door in the passage or entrance to the restricted area. The door may be electrically locked and unlocked by use of a fingerprint checking device installed nearby so that only authorized personnel may gain access to the area.

In operation, a fingerprint sensor of the fingerprint checking device captures an image of the fingerprint(s) of a person's specific finger(s) and converts gradations of the captured image to electrical signals from which to generate fingerprint data. The data thus obtained are checked against previously stored fingerprint data to see if there is a match between the two kinds of data.

Typically, a numeric keypad is attached outside the fingerprint sensor. When an operator operates the keypad to enter his or her identification (personal) number, the fingerprint data corresponding to the ID number are retrieved from the previously recorded fingerprint characteristic data.

The retrieved data are checked against the actually detected fingerprint data having been entered the fingerprint sensor.

In the above setup, the probability of false acceptance (i.e., someone else mistaken for an authorized person) through inadequate fingerprint verification may be reduced by checking a plurality of fingers of each person using an AND condition. Specifically, fingerprint data about a plurality of fingers of each authorized person are stored in advance. Only when the fingerprint data on all the fingers are matched, the person being checked is authorized for entry. Such a system is proposed illustratively in Japanese Patent Laid-open No. Sho 61-177580.

It may happen that the operator has his or her finger(s) injured and rendered useless for fingerprint checkup, or that fingerprints from a particular finger(s) cannot be recognized for some reason for identification. Such contingencies are addressed illustratively by checking a plurality of fingers of each person using an OR condition so as to reduce the probability of false rejection (i.e., an authorized person falsely rejected) through inadequate fingerprint verification. Specifically, fingerprint data about a plurality of fingers of each authorized person are stored in advance. If any one of the checked fingers matches the previously recorded fingerprint data, the person being checked is authorized for entry. This system is proposed illustratively in Japanese Patent Laid-open No. Hei 7-120417.

As outlined, the conventional fingerprint checking devices typically involve storing fingerprint data about a plurality of fingers of each authorized person in advance, and checking a plurality of fingers of each person using an AND or OR condition for enhanced checking performance. The AND and OR features, intended to reduce the probability of false acceptance or rejection, requires installing an AND function and an OR function separately in discrete components constituting the checking device.

Further, people's fingers have diverse characteristics: fingerprints may be prominent or inconspicuous, some fingertips may be constantly damp, and some fingers may have scars from injuries. Given such diversity, people often have difficulty in getting identified correctly under predetermined checking conditions. Furthermore, identity recognition performance can be worsened by the adoption of the AND or OR check.

In addition, there is a trade-off between the probability of false acceptance and that of false rejection, two basic parameters that determine fingerprint checking performance. That is, one probability is improved at the expense of the other with regard to a certain set of verifying conditions.

SUMMARY OF THE INVENTION

It is therefore an object of the present invention to overcome the above and other deficiencies and disadvantages of the prior art and to provide an easy-to-use human body checking apparatus for allowing either AND or OR checking to be selected on an personal basis so that identity checking performance is optimized to accommodate differences of human body characteristics of individuals.

According to one aspect of the present invention, an individuals checking system checks captured data of individuals characteristic point against previously recorded data of individuals characteristic point to see if there is a match therebetween. The system comprises an apparatus for recording of individuals characteristic point data and an apparatus for checking individuals characteristic point data. The apparatus for recording records a plurality of individuals characteristic point data on a plurality of persons to a database and for sets a checking mode and a checking level for the individuals characteristic point data for each of the persons. The apparatus for checking checks a captured individuals characteristic point data on a given person against the recorded individuals characteristic point data in the checking mode and at the checking level set for each of the persons.

In the system, the checking mode may include an AND checking mode and an OR checking mode. The AND checking mode may be a mode in which all of the captured individuals characteristic point data are checked against the recorded individuals characteristic point data for a match. The OR checking mode may be a mode in which one of the captured individuals characteristic point data is checked against the recorded individuals characteristic point data for a match.

In the system, the apparatus for recording the individuals characteristic point data may include an recording means of individuals characteristic point data, monitoring means of recording status, and determining means of checking mode/level.

The recording means of individuals characteristic point data may continuously record a plurality of individuals characteristic point data about each person wishing to register with the apparatus. The monitoring means of recording status may monitor difficulties in characteristic point data recognition depending on a state of individuals characteristic points of a given person. The determining means of checking mode/level may determine the checking mode and checking level suitable for each person in accordance with the recording status of individuals characteristic points.

In the system, the apparatus for checking the individuals characteristic point data may include checking mode retrieving means and checking level retrieving means. The checking mode retrieving means may retrieve a checking mode corresponding to an input ID number from among the individuals characteristic point data recorded in the database. The checking level retrieving means may retrieve a checking level corresponding to the input ID number from among the individuals characteristic point data recorded in the database.

In another aspect, the system may further comprise a checking and judging apparatus of multiple individuals characteristic point data. The checking and judging apparatus may check captured individuals characteristic point data against the individuals characteristic point data recorded in the database in accordance with the retrieved checking mode and checking level, and may judge the results of the checking.

BRIEF DESCRIPTION OF THE DRAWINGS

FIGS. 1 through 7 illustrate an embodiment of the present invention.

DETAILED DESCRIPTION OF THE PREFERRED EMBODIMENTS

FIGS. 1 through 7 illustrate an embodiment of an individuals checking apparatus, or a human body checking apparatus, according to the present invention. Throughout the figures, like reference characters designate like or corresponding parts.

Figure 1:
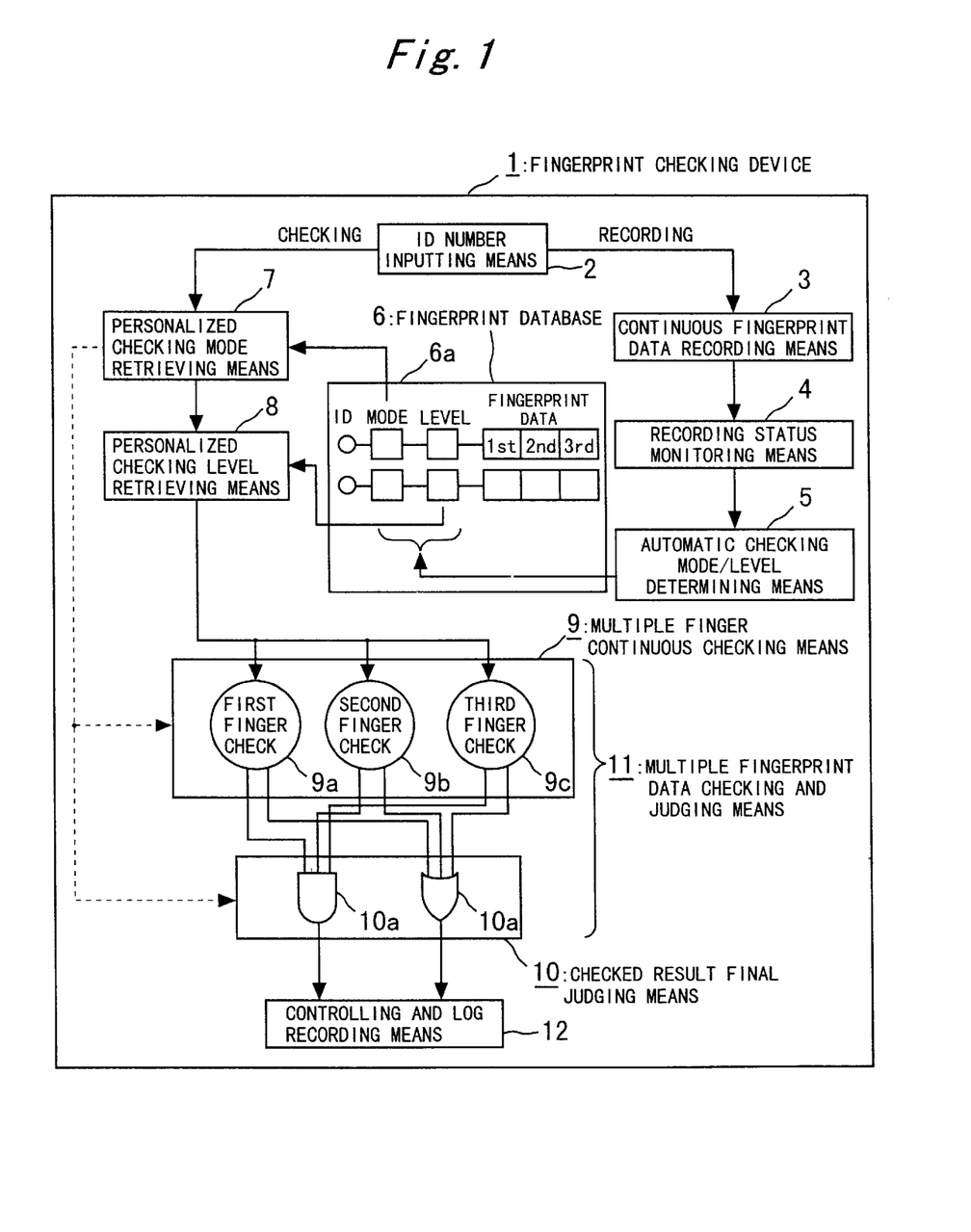
FIG. 1 is an overall block diagram of an embodiment of an individuals checking apparatus, or a human body checking apparatus, according to the present invention.

FIG. 1 is an overall block diagram of an embodiment of the individuals checking apparatus, or a human body checking apparatus. In FIG. 1, reference numeral 1 stands for a fingerprint checking device as an example of a human body checking apparatus; 2 for ID number inputting means such as a numeric keypad used to input an ID (personal) number; 3 for continuous fingerprint data recording means which, given an input ID number, continuously records fingerprint data about the person corresponding to the ID number; 4 for recording status monitoring means for monitoring and checking the status of recorded fingerprint data about the person in question; and 5 for automatic checking mode/level determining means for automatically determining checking modes (i.e. either AND or OR) and conditions (i.e., levels) suitable for a physical state of a given person's fingers according to their recording status.

The ID number inputting means 2, the continuous fingerprint data recording means 3, the recording status monitoring means 4 and the automatic checking mode/level determining means 5 constitute a human body characteristic point data recording means.

Reference numeral 6a denotes a memory means to memory fingerprint database 6 to which to record information from the above-mentioned means 2 through 5. As will be described later with reference to FIG. 3, the database 6 includes a checking mode, a checking level and fingerprint data recorded corresponding to each ID number. Reference numeral 7 stands for personalized checking mode retrieving means which, given an input ID number, retrieves from the fingerprint database 6 the checking mode for the person designated by the input ID number; 8 for personalized checking level retrieving means for likewise retrieving the checking level of the person in question from the database. The personalized checking mode retrieving means 7 and the personalized checking level retrieving means 8 constitutes a human body characteristic point data checking means.

Reference numeral 9 stands for multiple finger continuous checking means comprising first through third finger checking means 9a through 9c for continuously capturing and checking fingerprint data of a target person according to his or her checking mode and checking level in effect.

Reference numeral 10 denotes checked result final judging means for obtaining a final judged result by judging on the condition (AND or OR) determined by the checking mode based on the result of the continuous checks above. The means 10 includes an AND gate 10a and an OR gate 10b. The multiple finger continuous checking means 9 and the checked result final judging means 10 constitute multiple fingerprint data checking and judging means 11 or, generally, multiple human body characteristic point data checking and judging means.

Reference numeral 12 represents controlling and log recording means which, given the final result mentioned above, logs the results of control and of checks on the door and other related instruments of the checking device.

Figure 2:
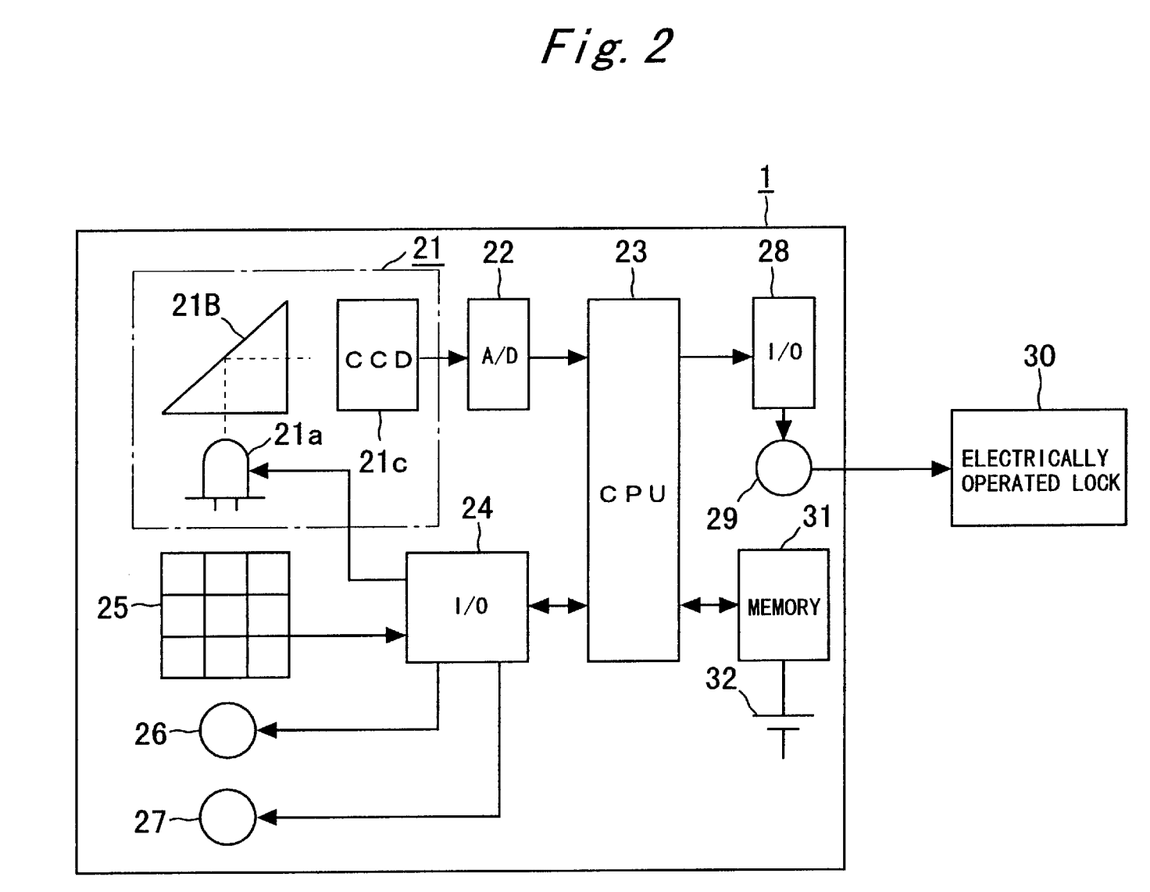
FIG. 2 is a block schematic diagram outlining components of the individuals checking apparatus.

FIG. 2 is a block schematic diagram outlining components of the individuals identifying apparatus. In FIG. 2, reference numeral 21 denotes a fingerprint sensor that captures images of fingerprints. The sensor 21 comprises an LED light source 21a, a prism 21b and a CCD camera 21c. Reference numeral 22 stands for an A/D converter for converting an analog image signal from the fingerprint sensor 21 to a digital image signal; 23 for a central processing unit (CPU); 24 for an input/output unit which is connected to the LED light source 21a, a numeric keypad 25, an indicator lamp 26 and a buzzer 27 and which exchanges signals with the CPU 23; 28 for another input/output unit connected to both the CPU 23 and an output relay 29; 30 for an electrically operated lock controlled by the output relay 29; 31 for a memory which is connected to the CPU 23 and which stores data including the recorded fingerprint data and operation log data; and 32 for a battery for backing up the memory 31.

The fingerprint sensor 21 in FIG. 2 corresponds to the ID number inputting means 2 in FIG. 1. The central processing unit 23 works, in an computing operation, as the human body characteristic point data recording means, which includes the continuous fingerprint data recording means 3, the recording status monitoring means 4 and the automatic checking mode/level determining means 5 shown in FIG. 1. The central processing unit 23 also works, in an computing operation, as the human body characteristic point data checking means, which includes the personalized checking mode retrieving means 7 and the personalized checking level retrieving means 8. Further, the central processing unit 23 works, in an computing operation, as the multiple human body characteristic point data checking and judging means, which includes the multiple finger continuous checking means 9 and the checked result final judging means 10. The memory 31 functions as both the memory means 6a and the controlling and log recording means 12 shown in FIG. 1.

Figure 3:
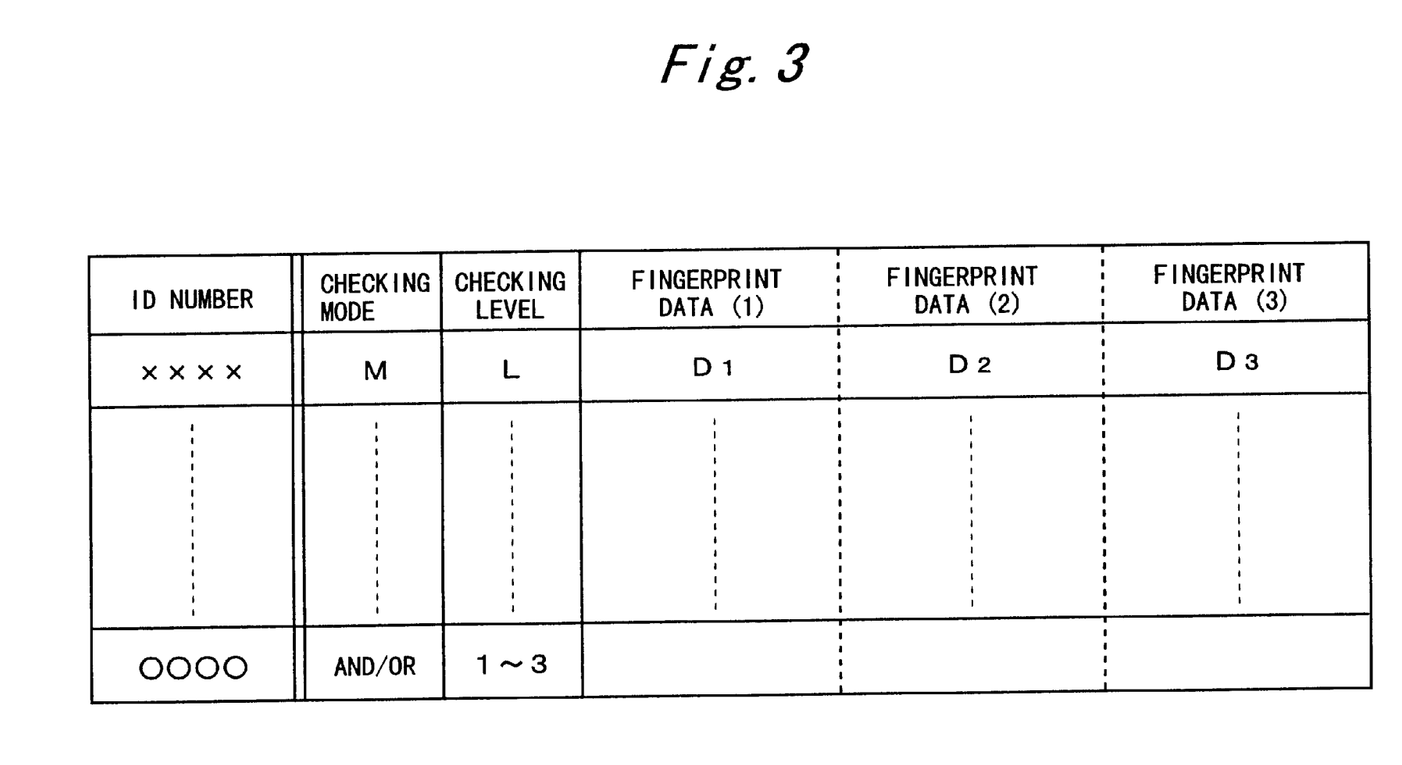
FIG. 3 is an explanatory view of a fingerprint database.

FIG. 3 is an explanatory view of a fingerprint database. In FIG. 3, a typical constitution of the fingerprint database 6 is outlined. At a time of recording finger print date of an individual person, such data is stored in an ID number field of the fingerprint database 6 as a checking mode M (AND or OR check, and the number of fingers to be checked) and a checking level L determined by the automatic checking mode/level determining means 5, as well as fingerprint data $D_1$ through $D_3$ recorded by the continuous fingerprint data recording means 3.

Figure 4:
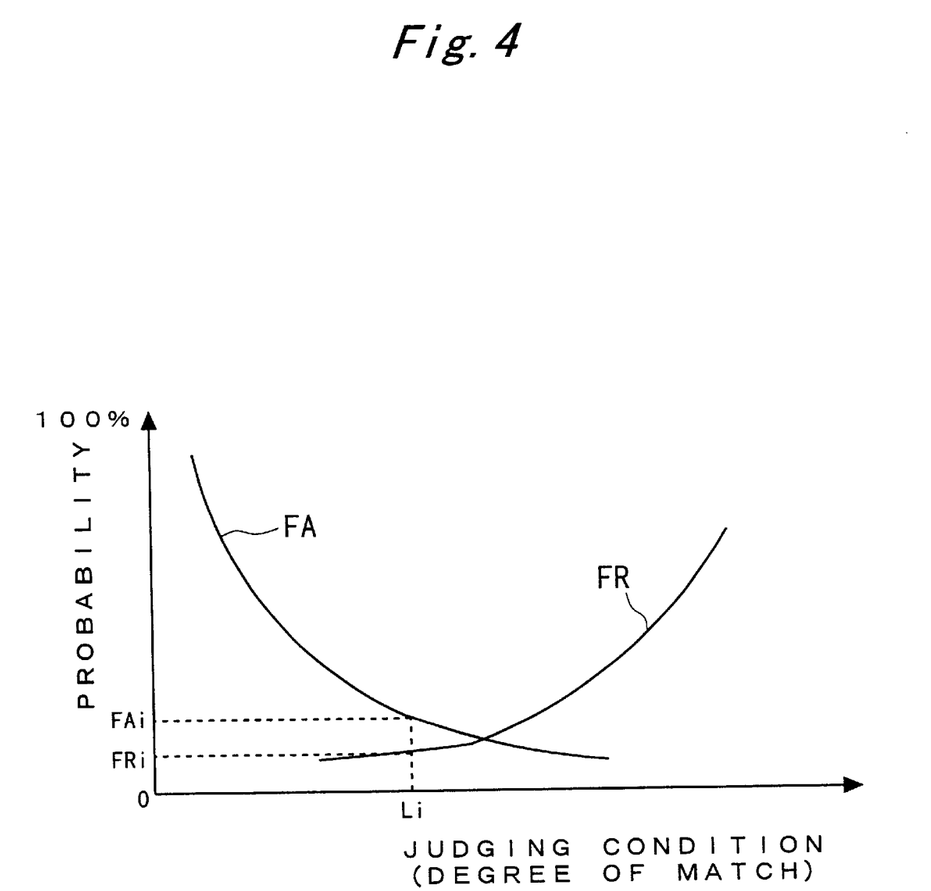
FIG. 4 is a graphic representation of the probability of false acceptance and that of false rejection.

FIG. 4 is a graphic representation of the probability of false acceptance and that of false rejection. In FIG. 4, a curve FA represents a typical probability of false acceptance (someone else mistaken for an authorized person), and a curve FR denotes a typical probability of false rejection (an authorized person falsely rejected). The probability of false acceptance FA becomes smaller as the checking level Li (i.e., degree of match) is raised, while the probability of false rejection FR becomes strongly higher, when the checking level Li is raised. Each of these curves about each person is specific to the fingerprint checking device. The checking level Li is determined in advance for each person so that the probabilities of accepting the authorized person and of rejecting others will be optimized.

Figure 5:
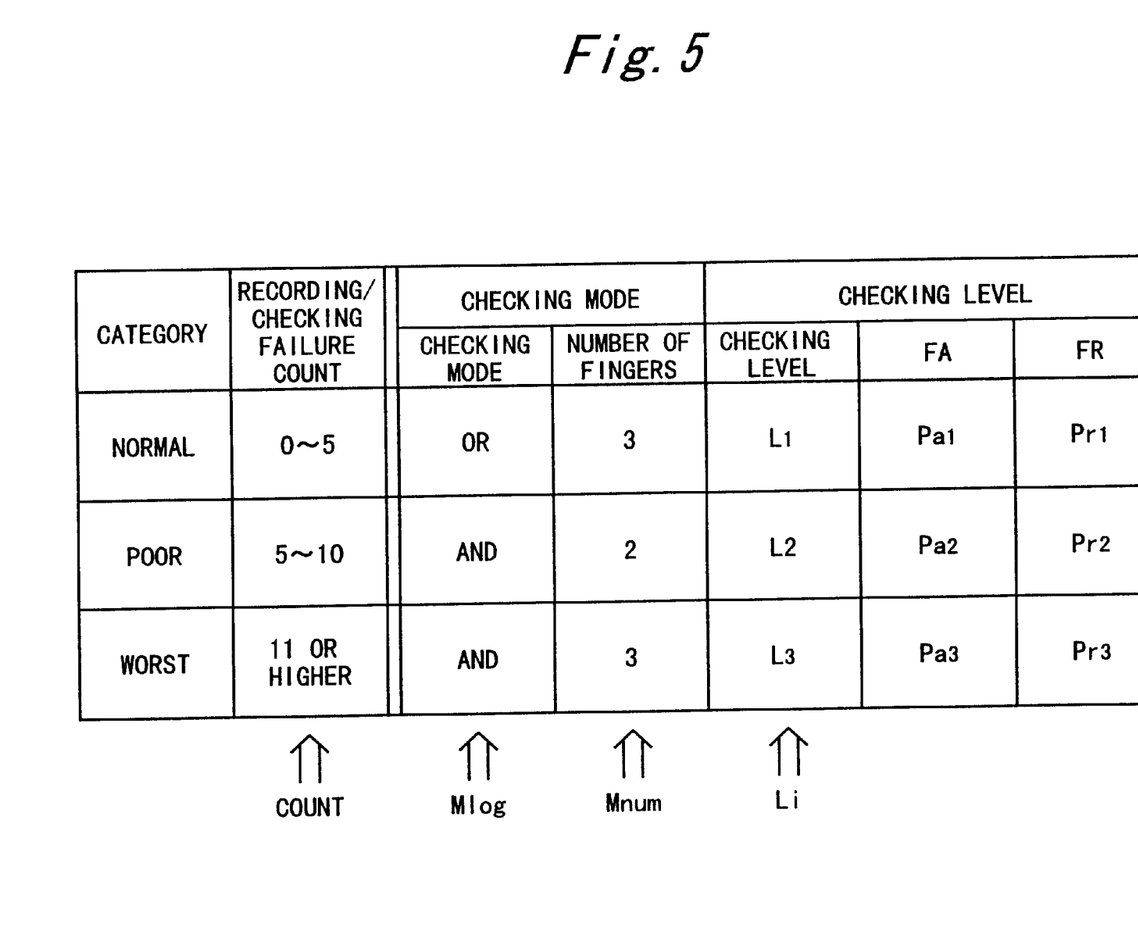
FIG. 5 is an explanatory view of a table for determining checking modes and checking levels.

FIG. 5 is an explanatory view of a table for determining checking modes and checking levels. The checking mode and checking level determining table shown in FIG. 5 is used by the recording status monitoring means 4 and automatic checking mode/level determining means 5 shown in FIG. 1. At the time of fingerprint data recording, the number of times the device failed to recognize consecutively a given person is used as a basis for classifying the physical state of that person's fingers into one of three categories: "normal", "poor" and "worst." According to the category thus determined, the checking mode and checking level for the person in question are decided.

Here, the categories are classified into "normal" , "poor" and "worst", when the number of failure of checking is set 0–5, 6–10, 11 times and more respectively. This number of failure is identified as "COUNT". The checking mode includes a checking mode "Mlog" and designated finger count "Mnum" i.e. designated number of fingers for registration and checking.

The checking level includes a checking level "Li" and the corresponding probability of false acceptance FA and probability of false rejection FR.

In the "normal" category, fingerprints are checked at a level $L_1$. The probability of false rejection FR is set for Pr1, and the probability of false acceptance FA is considered adequate in terms of ultimate performance. This brings into effect the OR check, a checking scheme under which a match of a single finger is regarded as sufficient for identification. If an attempt to match the person failed at the time of data recording, the "poor" category is selected because low probability of false rejection is not guaranteed for the person in question. In that case, the checking level is reduced to $L_2$, i.e. $L_2<L_1$, and the probability of false rejection FR is lowered to Pr2, i.e. Pr2<Pr1 (so as to boost sensitivity). As a result, the probability of false acceptance FA is raised to Pa2, i.e. Pa2>Pa1, making it difficult to provide predetermined basic performance.

In this case, in order to improve the ultimate performance of false acceptance, an AND checking mode is designated in which two probabilities of false acceptance FA for two fingers are multiplied in checking operation.

If more attempts still failed to match the person in question, then the "worst" category is selected. The probability of false rejection FR is lowered further to Pr3, i.e. Pr3<Pr2, and a checking level L3 is selected under which the probability of false acceptance Pa is raised to Pa3, i.e. Pa3>Pa2. In such a case, an AND checking mode is selected in which three fingers are checked to ensure adequate performance of false acceptance. As stated, the required levels above should be in the following order: Pa1<Pa2<Pa3, and Pr1>Pr2>Pr3.

Now, how the preferred embodiment works will be described with reference to FIGS. 6 and 7.

A. Fingerprint Recording Process (FIG. 6)

Figure 6:
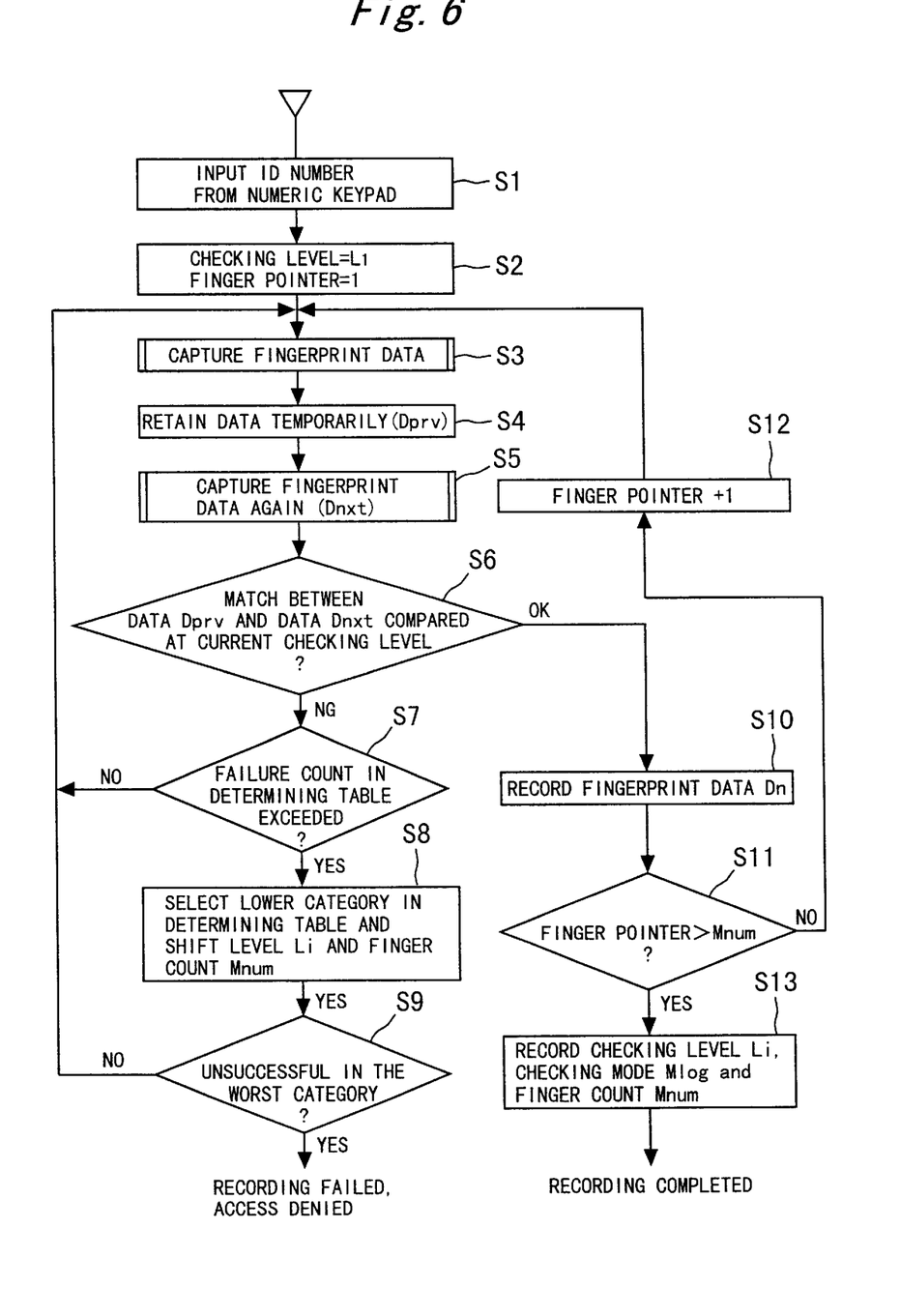
FIG. 6 is a flowchart of steps constituting a fingerprint recording process.

FIG. 6 shows a flowchart for a fingerprint recording process. In step S1, a person, wishing to have his or her fingerprint data recorded, inputs an ID number through the numeric keypad 25 shown in FIG. 2. In step S2, the checking level is set at $L_1$ and a finger pointer is set at one (i.e. first finger) as initial values. Here, the finger pointer is an internal counter or pointer used for sequential recording and checking of the designated number of fingers (Mnum).

In step S3, fingerprint data of the person in question is captured (for the first time). In step S4, the captured data is retained temporarily as Dprv. In step S5, the fingerprint data of the same finger is captured for the second time as Dnxt to ensure reliability of the recorded data and to verify the person's identity.

In step S6, the temporarily retained fingerprint data Dprv and the recaptured fingerprint data Dnxt are compared and matched at the relevant checking level Li. If the result is a mismatch, step S7 is reached so that the preceding steps are repeated as many times as a number of failure count (COUNT) set for the relevant category in the table for determining the checking modes and checking levels as shown in FIG. 5. If the predetermined failure count has been exceeded with no match attained, it is judged that the person's fingers are in a poor state and are not fit for normal identification at the current level, and step S8 is reached. In step S8, the next lowest category is selected from the determining table so that matching conditions are shifted to another checking level Li and to a different designated finger count (Mnum) designated in the table.

In step S9, a check is made to see if the recording of fingerprint data and the verification of the person's identity have failed under the conditions of the worst category. If the result of the check in step S9 is affirmative, the person in question is judged to have failed in attempting to record fingerprint data and regarded as unsuitable for access, and the processing is terminated.

If there is a match in step S6, the recording and checking of fingerprint data in the current category of finger status are judged to be feasible, and step S10 is reached. In step S10, the temporarily retained fingerprint data Dprv are recorded consecutively into the fingerprint database 6. The recording procedure needs to be repeated as many times as the designated finger count Mnum. For that reason, in step S11, a check is made to see if the finger pointer has exceeded the designated finger count Mnum. If the counter has yet to be exceeded, the finger pointer is incremented by one in step S12, and step S3 is acted again.

If the fingerprint data on all fingers have been recorded as a result of the repeated recording and checking steps above, step S13 is reached. In step S13, the checking level Li, the checking mode Mlog and the designated finger count Mnum in the current category are recorded in the fingerprint database 6. This completes the fingerprint recording process.

The above steps S1 through S13 is carried out by the ID number inputting means 2 and the human body characteristic point data recording means( including the continuous fingerprint data recording means 3, the recording status monitoring means 4 and the automatic checking mode/level determining means 5) and the memory means 6 shown in FIG. 1. In more detail, the steps S3 through S6 and S10 through S12 are carried out by the continuous fingerprint data recording means 3. The steps S7 through S9 are carried out by the recording status monitoring means 4. The step S13 is carried out by the automatic checking mode/level determining means 5.

In FIG. 2, the above steps S1 through S13 is carried out by the fingerprint sensor 21, central processing unit 23, numeric keypad 25, the memory 31, etc.

B. Fingerprint Checking Process (FIG. 7)

Figure 7:
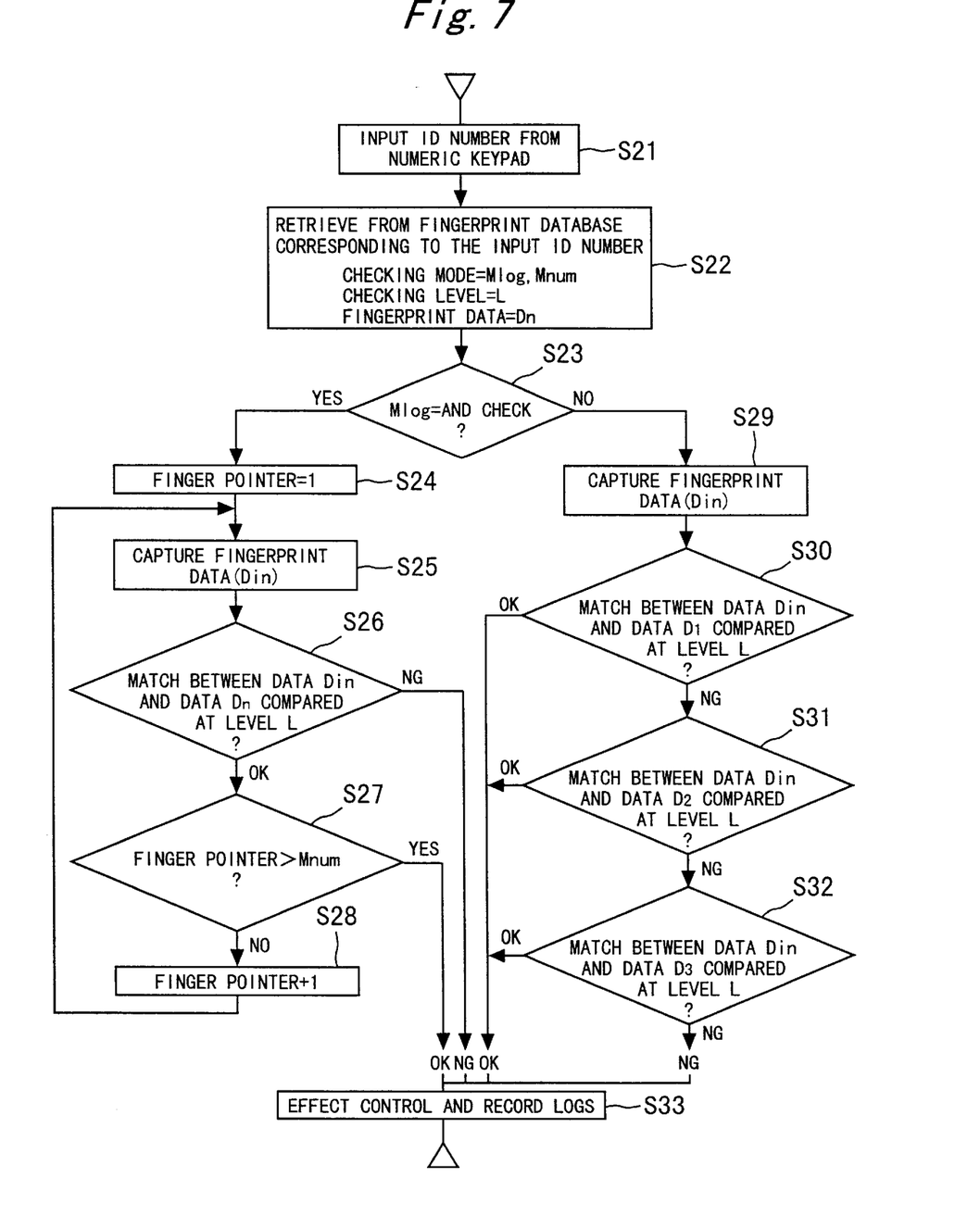
FIG. 7 is a flowchart of steps making up a fingerprint checking process.

FIG. 7 shows a flowchart of conducting a fingerprint checking process. In step S21, a person, wishing to have his or her fingerprint data checked for identification, inputs an ID number through the numeric keypad 25 shown in FIG. 2. In step S22, the checking mode Mlog, designated finger count Mnum, checking level L and fingerprint data Dn corresponding to the input ID number are retrieved from the fingerprint database 6. In step S23, a check is made to see if the checking mode Mlog is an AND check. If the AND check is recognized in step S23, step S24 is reached; if an OR check is recognized, step S29 is reached.

In step S24, the finger pointer is set at one (the first finger). In step S25, fingerprint data Din on the person's n-th finger are captured. In step S26, the captured fingerprint data Din and the recorded fingerprint data Dn retrieved from the fingerprint database 6 are compared and checked at the checking level L. If there is a match between the two kinds of data, step S27 is reached. In step S27, a check is made to see if the finger pointer has exceeded the designated finger count Mnum. If the finger count has yet to be exceeded, step S28 is reached in which the finger pointer is incremented by one. Then step S25 is reached again.

If the finger pointer is found to have exceeded the designated finger count Mnum in step S27 as a result of the repeated comparing and checking steps above, i.e., if the checked results of all fingers are matched, the final result is judged to be acceptable. If there is a mismatch in step S26, i.e., if the checked result of even a single finger is a mismatch, the final result is judged to be unacceptable.

If step S29 is reached, the fingerprint data Din about any one of the recorded fingers are captured.

In steps S30 through S32, the input finger print data Din, i.e. the captured fingerprint data, and the retrieved fingerprint data $D_1$ through $D_3$ are compared and checked successively at the checking level L retrieved from the fingerprint database 6. If any one of the checked fingers has matched data, the final result is judged to be acceptable. If none of the checked fingers matches the data $D_1$ through $D_3$, then the final result is judged to be unacceptable. Given the final result, suitable control is effected and operation logs are recorded in step S33.

The above steps S21 through S33 is carried out by the ID number inputting means 2 and the human body characteristic point data checking means (including the personalized checking mode retrieving means 7 and the personalized checking level retrieving means 8), the multiple human body characteristic point data checking and judging means (including the multiple finger continuous checking means 9 and the checked result final judging means 10), the controlling and log recording means 12, etc. In more detail, the steps S22 is carried out by the personalized checking mode retrieving means 7 and the personalized checking level retrieving means 8. The steps S23 through S32 is carried out by the multiple fingerprint data checking and judging means.

In FIG. 2, the above steps S21 through S33 is carried out by the fingerprint sensor 21, central processing unit 23, numeric keypad 25, the memory 31, etc.

As described, the fingerprint checking device of the present invention is capable of executing the AND and the OR check on a plurality of fingers of the same person. One of the two kinds of check may be selected as needed on a personal basis, which is a convenient feature. Since the physical state of fingerprints differs from one person to another, the device selects a checking mode and a checking level optimally fit for. the person in question so that fingerprint checking performance, i.e. probabilities of false acceptance and false rejection, is optimized.

Although the above embodiment was shown using fingerprints as the medium with which to identify persons, this is not limitative of the invention. Alternatively, any of voiceprints, retina patterns, handprints, facial features, and other physical characteristics or their concomitant functions, i.e., human body characteristic data, may be utilized.

The features and the advantages of the present invention may be summarized as follows.

As described and according to one aspect of the present invention, there is provided a human body checking apparatus which records human body characteristic point data to a database about each of persons wishing to register. The apparatus further setts a checking mode and a checking level for each person, wherein a plurality of items of human body characteristic point data on a given person are checked against the recorded human body characteristic point data by use of the checking mode and checking level previously set for the person in question. In the invention, the checking mode may include an AND check mode and an OR check mode. With this structure, personalized identity checks are managed easily on each person by use of his or her relevant checking mode and level. It should be noted that the checking mode and level vary from one person to another.

According to another aspect of the present invention, the human body checking apparatus may continuously record a plurality of items of human body characteristic point data about each person wishing to register. The apparatus monitors difficulties in characteristic point data recognition which are contingent on a physical state of human body characteristic points of a given person, and determine the checking mode and checking level suitable for each person in accordance with that state of human body characteristic points. With this structure, a checking mode and a checking level suitable for each person's distinct human body characteristic points are automatically determined for easy management of personalized identity checks.

According to another aspect of the present invention, the human body checking apparatus may retrieve a checking mode and a checking level corresponding to an input ID number, from among the human body characteristic point data recorded in the database. This simplifies checking operations by bypassing some operations and chores conventionally required of an operator.

According to another aspect of the present invention, the human body checking apparatus may check the human body characteristic point data recorded in the database against a plurality of items of human body characteristic point data in accordance with the retrieved checking mode and checking level, and may judge results of the checking. This allows identity checks to be carried out in an optimal manner without detracting from ultimate checking performance.

According to another aspect of the present invention, fingerprints may be used as the human body characteristic points. This feature allows the inventive human body checking apparatus to function as a convenient high-performance fingerprint checking device.

What is claimed is:

1. A system for verifying the identity of individuals comprising:

recording apparatus recording in a database a plurality of identification data for each of a plurality of individuals and setting and recording in the database a checking mode and checking level as part of the identification data for each individual for use in verifying the identity of an individual, based on the respective identification data for each individual, wherein the recording apparatus, in constructing the database, receives first and second images for each item of identification data for an individual, compares the first and second images to each other, and, if the first and second images do not match, changes at least one of the checking mode and the checking level to be recorded as part of the identification data, and the checking mode includes an AND checking mode and an OR checking mode, and in the AND checking mode, all of the identification data recorded for a selected individual are compared to a plurality of the newly captured identification data to verify the identity of an individual seeking verification, and in the OR checking mode, all of the identification data recorded for a selected individual are compared only to a single one of the newly captured identification data to verify the identity of an individual seeking verification;

the recording apparatus first applies, in comparing the first and second images, the OR checking mode, and, if the first and second images do not match, the recording apparatus lowers the checking level and applies the AND checking mode; and data checking apparatus for comparing newly captured identification data for a selected individual with identification data previously recorded in the database, using the checking mode and checking level of the identification data for the selected individual, to verify the identity of the individual supplying the newly captured identification data.

2. The system according to claim 1, wherein each individual is assigned an ID number and the identification data includes the ID number, and the data checking apparatus comprises:

checking mode retrieving means for retrieving from the database a checking mode corresponding to an ID number supplied by an individual seeking verification of identity; and checking level retrieving means for retrieving from the database a checking level corresponding to the ID number supplied by an individual seeking verification of identity.

3. The system according to claim 1, wherein the identification data includes fingerprints.

4. The system according to claim 1, wherein, if the first and second images do not match after a fixed number of comparisons, the recording apparatus lowers the checking level.

5. The system according to claim 1, wherein, when the first and second images match, the recording apparatus records the identification data, including the checking mode and the checking level applied in obtaining the match.

* * * * *